US012148382B2

(12) United States Patent
Choi et al.

(10) Patent No.: US 12,148,382 B2
(45) Date of Patent: Nov. 19, 2024

(54) IMAGE CHANGE SEQUENCE TO PREVENT OPTICAL ARTIFACTS IN LOW REFRESH RATE AMOLED DISPLAYS

(71) Applicant: Google LLC, Mountain View, CA (US)

(72) Inventors: Sangmoo Choi, Mountain View, CA (US); Sang Young Youn, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/275,822

(22) PCT Filed: Mar. 30, 2021

(86) PCT No.: PCT/US2021/070339
§ 371 (c)(1),
(2) Date: Aug. 4, 2023

(87) PCT Pub. No.: WO2022/211868
PCT Pub. Date: Oct. 6, 2022

(65) Prior Publication Data
US 2024/0096280 A1 Mar. 21, 2024

(51) Int. Cl.
*G09G 3/3258* (2016.01)
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2310/08;
(Continued)

(56) References Cited

U.S. PATENT DOCUMENTS

2015/0243203 A1* 8/2015 Kim ..................... G09G 3/3291 345/212
2016/0035260 A1 2/2016 Kim et al.
(Continued)

FOREIGN PATENT DOCUMENTS

EP 3675111 7/2020
EP 3680885 7/2020

OTHER PUBLICATIONS

International Preliminary Report on Patentability in International Appln. No. PCT/US2021/070339, mailed on Oct. 3, 2023, 7 pages.
(Continued)

*Primary Examiner* — Abdul-Samad A Adediran
(74) *Attorney, Agent, or Firm* — Fish & Richardson P.C.

(57) ABSTRACT

A first image is rendered on an active area of an OLED display panel with a first refresh rate that is below a threshold refresh rate and, subsequent to rendering the first image with the first refresh rate, a second image that is different from the first image is rendered on the active area, where the rendering of the second image includes rendering a number of initial frames of the second image at a second refresh rate that is at or above the threshold refresh rate. After rendering the number of initial frames of the second image at the second refresh rate, additional frames of the second image on the active area are rendered with the first refresh rate, where the number of initial frames is greater than 1.

17 Claims, 9 Drawing Sheets

(52) U.S. Cl.
CPC . *G09G 2310/08* (2013.01); *G09G 2320/0247* (2013.01); *G09G 2330/021* (2013.01); *G09G 2340/0435* (2013.01)

(58) Field of Classification Search
CPC ..... G09G 2320/0247; G09G 2330/021; G09G 2340/0435; G09G 3/20; G09G 3/3291; G09G 5/006
USPC .......................................................... 345/212
See application file for complete search history.

(56) References Cited

U.S. PATENT DOCUMENTS

| | | | |
|---|---|---|---|
| 2016/0284264 A1 | 9/2016 | Lee et al. | |
| 2017/0243548 A1* | 8/2017 | Wang | G09G 3/20 |
| 2019/0189079 A1* | 6/2019 | Seo | G09G 5/006 |
| 2020/0211475 A1 | 7/2020 | Park et al. | |

OTHER PUBLICATIONS

International Search Report and Written Opinion in International Appln. No. PCT/US2021/070339, mailed on Dec. 12, 2021, 10 pages.

* cited by examiner

IMAGE CHANGE SEQUENCE TO PREVENT OPTICAL ARTIFACTS IN LOW REFRESH RATE AMOLED DISPLAYS

CROSS-REFERENCE TO RELATED APPLICATION

This application is a US 371 National Phase application from PCT/US2021/070339 filed Mar. 30, 2021, the disclosures of which are incorporated herein by reference in their entirety.

TECHNICAL FIELD

This description relates to displays on computing devices.

BACKGROUND

Displays for computing devices can have modifiable refresh rates, or rates of updating or changing pixel content. In general, lower refresh rates reduce power consumption by the display, increasing battery life, whereas higher refresh rates can improve graphical output.

SUMMARY

In a general aspect, a display panel includes a plurality of pixels arranged in an array, with the array including rows and columns and each pixel of the array including at least one OLED light-emitting device. The display panel also includes a plurality of pixel circuits, with each pixel circuit associated with one of the OLED light-emitting devices and configured to drive its associated OLED light-emitting device and a display driver. The display driver is configured to supply signals to the pixel circuits to cause the display panel to render images on an active area of the panel with a plurality of different refresh rates, render a first image on the active area with a first refresh rate that is below a threshold refresh rate, and, subsequent to rendering the first image with the first refresh rate, render a second image that is different from the first image on the active area. The rendering of the second image includes rendering a number of initial frames of the second image at a second refresh rate that is at or above the threshold refresh rate, and, after rendering the number of initial frames of the second image at the second refresh rate, rendering additional frames of the second image on the active area with the first refresh rate, where the number of initial frames is greater than 1.

Implementations can include one or more of the following features, alone or in any combination.

In an example, the threshold rate can be 60 Hz or lower.

In another example, the threshold rate can be 10 Hz or lower.

In another example, the first refresh rate can be a factor of the second refresh rate.

In another example, the number of initial frames rendered at the first refresh rate can be equal to the quotient of the second refresh rate divided by the first refresh rate.

In another example, the display driver can be configured to transmit tearing effect (TE) signals once per frame period to an external processor from which the display driver receives frames of image data to render on the active area.

In another example, the display driver can be configured to receive a command from the external processor in response to the external processor counting a threshold number of TE signals received from the display driver during the rendering of the number of initial frames of the second image at a second refresh rate, and in response to receiving the command, the display driver can begin rendering the second image at the first refresh rate.

In another example, the display driver can be configured to count a number of TE signals transmitted to the external processor during the rendering of the number of initial frames of the second image at a second refresh rate, and the display driver can be configured to begin rendering the second image at the first refresh rate in response to the number of counted TE signals equaling a predetermined number.

In another aspect, a display panel includes a plurality of pixels arranged in an array, with the array including rows and columns and each pixel of the array including at least one OLED light-emitting device. The display panel also includes a plurality of pixel circuits, with each pixel circuit associated with one of the OLED light-emitting devices and configured to drive its associated OLED light-emitting device and a display driver. The display driver is configured to supply signals to the pixel circuits to cause the display panel to render images on an active area of the panel with a plurality of different refresh rates, render a first image on the active area with a first refresh rate that is above a threshold refresh rate, and, subsequent to rendering the first image with the first refresh rate, render a second image that is different from the first image on the active area. The rendering of the second image includes rendering a number of initial frames of the second image at the first refresh rate, and, after rendering the number of initial frames of the second image at the first refresh rate, rendering additional frames of the second image on the active area with a second refresh rate, wherein the second refresh rate is equal to or below the threshold rate, and wherein the number of initial frames is greater than 1.

Implementations can include one or more of the following features, alone or in any combination.

In an example, the threshold rate can be 30 Hz or lower.

In another example, the threshold rate can be 10 Hz or lower.

In another example, the first refresh rate can be a factor of the second refresh rate.

In another example, the number of initial frames rendered at the first refresh rate can be equal to the quotient of the second refresh rate divided by the first refresh rate.

In another example, the display driver can be configured to transmit tearing effect (TE) signals once per frame period to an external processor from which the display driver receives frames of image data to render on the active area.

In another example, the display driver can be configured to receive a command from the external processor in response to the external processor counting a threshold number of TE signals received from the display driver during the rendering of the number of initial frames of the second image at a second refresh rate, and in response to receiving the command, the display driver can begin rendering the second image at the second refresh rate.

In another example, the display driver can be configured to count a number of TE signals transmitted to the external processor during the rendering of the number of initial frames of the second image at a first refresh rate, and the display driver can be configured to begin rendering the second image at the second refresh rate in response to the number of counted TE signals equaling a predetermined number.

In another aspect, a method includes rendering a first image on an active area of an OLED display panel with a first refresh rate that is below a threshold refresh rate and, subsequent to rendering the first image with the first refresh rate, rendering a second image that is different from the first image on the active area, where the rendering of the second image includes rendering a number of initial frames of the second image at a second refresh rate that is at or above the threshold refresh rate. After rendering the number of initial frames of the second image at the second refresh rate, additional frames of the second image on the active area are rendered with the first refresh rate, where the number of initial frames is greater than 1.

Implementations can include one or more of the following features, alone or in any combination.

In an example, the threshold rate can be 60 Hz or lower.

In another example, the first refresh rate can be a factor of the second refresh rate.

In another example, the number of initial frames rendered at the first refresh rate can be equal to the quotient of the second refresh rate divided by the first refresh rate.

The details of one or more implementations are set forth in the accompanying drawings and the description below. Other features will be apparent from the description and drawings, and from the claims. Any feature(s) described herein in relation to one aspect, embodiment, example, or implementation may be combined with any other feature(s) described herein in relation to any other aspect, embodiment, example, or implementation as appropriate and applicable.

Like reference numbers refer to like elements. In the following description, where relative terms, such as "top", "topmost", "bottom", "bottommost", "higher" and "lower" are used with reference to a display, device, system, feature thereof and/or otherwise, these may refer to the "top", "bottom" etc. of the relevant display, device, system, feature thereof etc. when it is in the orientation in which it is intended to be used and/or viewed by a user.

DETAILED DESCRIPTION

A refresh rate of a display can represent a rate at which rows of pixels in the display are refreshed (i.e., have the amount or color of light emitted from the pixels updated), and/or receive signals that cause the pixels to generate an updated image on the display. In general, a higher refresh rate can improve image quality in applications in which the image changes, such as video applications or video game applications, and a lower refresh rate can reduce power consumption by the display. However, when a display operates at a low refresh rate and an image on the display changes, a technical problem can arise due to the hysteresis effect of thin-film transistors used to drive pixels of the display, which results in a poor image transitions from the old image to the new image.

Figure 1:
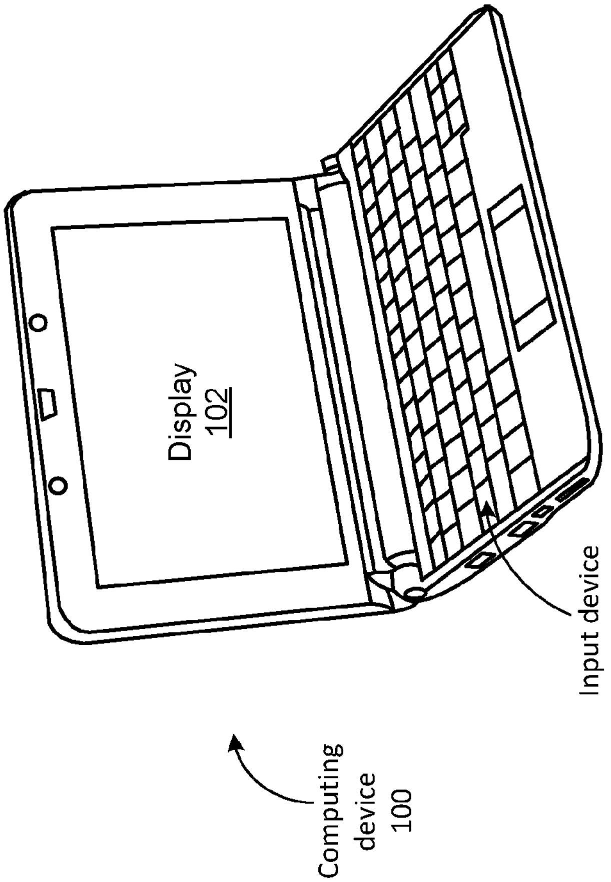
FIG. 1 is a diagram of a computing device according to an example implementation.

FIG. 1 is a diagram of a computing device 100 according to an example implementation. The computing device 100 can include a display 102 and an input device 104. The display 102 can present, provide, output, and/or display graphical and/or visual output. In some examples, the display 102 can include a touchscreen display that receives touch input, such as a capacitive touchscreen display and/or a resistive touchscreen display. The display 102 can include a light-emitting diode (LED) display, such as an organic LED (OLED) display and/or active-matrix organic LED (AMOLED) display, as non-limiting examples.

The input device 104 can receive input from a user. The input device 104 can include, for example, a keyboard, a trackpad, or a home button, as non-limiting examples.

Figure 2:
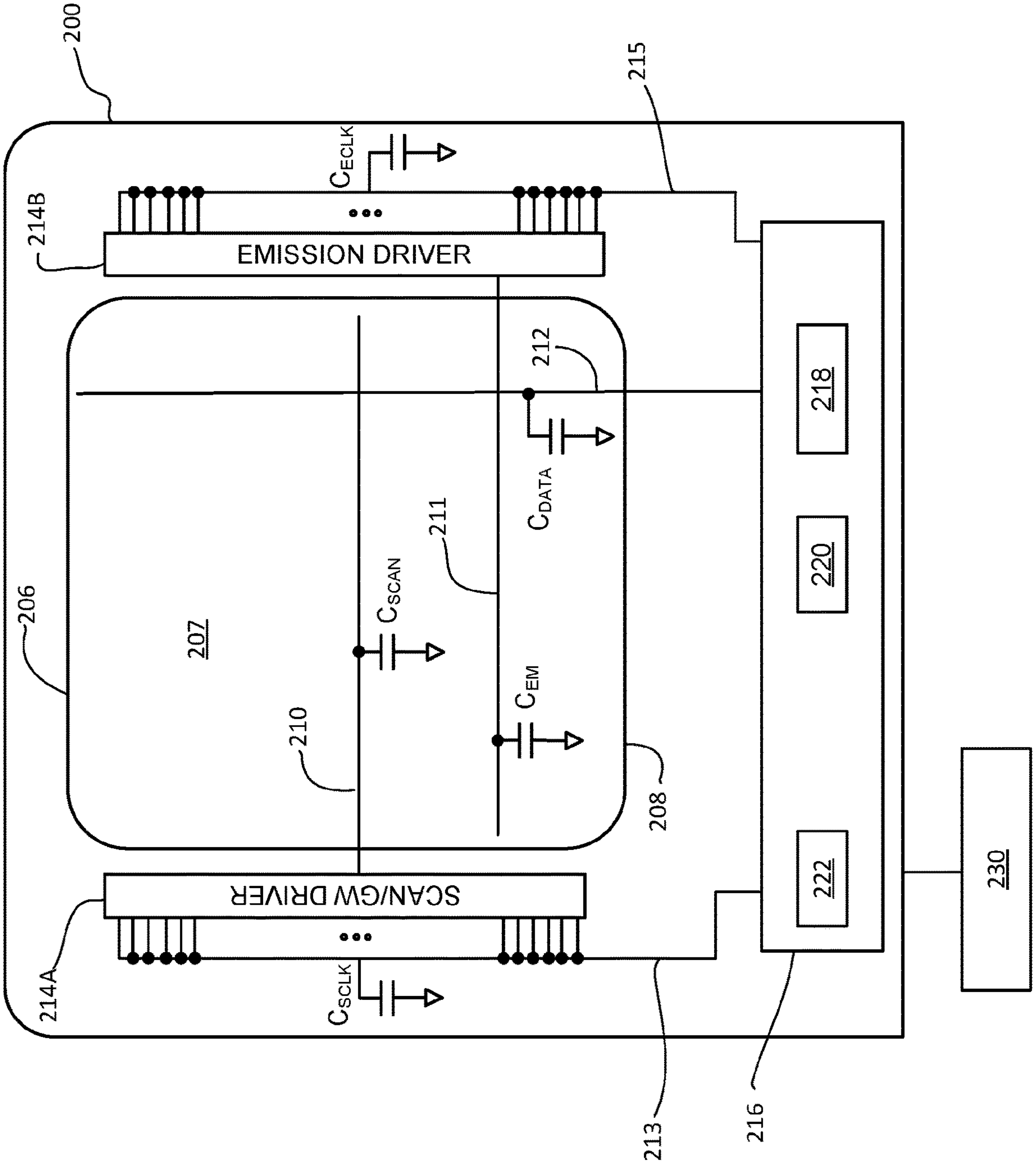
FIG. 2 is a schematic diagram of a display panel that can be used in the display included in the computing device of FIG. 1.

FIG. 2 is a schematic diagram of a display panel 200 that is part of, and used in, the display 102 included in the computing device 100 of FIG. 1. The display panel 200 can include an array of pixels, and a pixel circuit for driving the pixel associated with each pixel, with the array having rows and columns. The display panel 200 can include multiple horizontal signal lines 210, 211 that provide signals to rows of pixel circuits in the display panel. The horizontal signal lines can include a plurality of scan lines 210 for selecting the pixel circuits of each row of pixel circuits and a plurality of emission lines for controlling the electric current transfer to the emissive device (e.g., OLEDs) in the pixel circuits.

For clarity, two horizontal signal lines (a scan line 210, and an emission line 211) are shown in FIG. 2, but many more horizontal signal lines exist in the display panel 200. Horizontal may refer to their position when the computing device 100 is in the orientation in which it is intended to be used. The horizontal signals lines 210 and/or rows of pixels can be numbered sequentially from a top portion 206 of an active area 207 of the display panel 200 to a bottom portion 208 of the active area 207 of the display panel 200. The top portion 206 of the active area 207 refers to the top portion of the active area 207 when the display panel 200 is in the orientation in which it is to be viewed by a user.

During each frame that is displayed, the horizontal signal lines 210, 211 can sequentially and/or successively provide signals to the rows of pixels, with the first and/or topmost row of pixels receiving signals at or near a beginning of the frame and the last and/or the lower-most and/or bottommost row of pixels receiving signals at or near an end of the frame. The display panel 200 can include a scan line driver 214A and an emission line driver 214B that provide signals on the horizontal signal lines 210, 211. For example, signals provided by the scan line driver 214A over a scan line 210 to a pixel can be used to initialize and reset a pixel for receiving new data signals when a new frame is provided to the display panel, and signals provided by the emission line driver 214B over an emission line 211 to a pixel can be used to turn driving current to the pixel on or off.

The display can include column data lines 212 for controlling the pixel circuits of each column of pixel circuits (e.g., by writing a data voltage for driving the pixel to the pixel circuit associated with the pixel). For clarity, only one column data line is shown in FIG. 2, but many more exist in the display panel 200. The column data lines 212 can provide signals to columns of pixels in the active area 207 of the display panel 200. The horizontal signal lines 210, 211 and the column data lines 212 can combine to provide signals to individual pixels on the display panel 200, causing the individual pixels to emit a specific amount and color of light seen by a user. The display panel 200 can include a column line driver 218 that provides signals to the column data lines 212.

The display panel 200 can include a display driver 216 that can control the output of the display panel 200, such as by providing input to the horizontal signal lines 210 via the gate line driver 214A and the emission line driver 214B, and by providing input to the column data lines 212 via the column line driver 218.

The display driver 216 can include a timing controller 220. The timing controller 220 can generate and/or provide signals to the horizontal signal lines 210 via the gate line driver 214A and the emission line driver 214B, and to column data lines 212 via the column line driver 218. The signals can include clock signals and/or start pulses. The signals generated and/or provided by the timing controller 220 can instruct and/or prompt the horizontal signal lines 210 and/or column data lines 212 to refresh and/or update the image presented by the pixels, such as by sending signals to the pixels. The timing controller 220 can send and/or provide the signals to the gate line drivers 214A, 214B. The display driver 216 can include a memory 222 that stores executable instructions for controlling pixels in the active area 207 of the display panel 200.

The display driver 216 of the display panel 200 can communicate with an external processor 230 (e.g., a GPU or a processor that is part of a system-on-a-chip (SoC)) that can provide signals to the display driver for driving pixels in the active area 207 of the panel.

When the display panel 200 operates to display video and/or still images with the frames of the video/images being refreshed in the active area 207, power is consumed by the display panel 200. The LEDs themselves in the pixels of the active area 207 consume power, but a significant factor contributing to the overall power consumption of the display panel 200 is the dynamic power dissipation in driving panel circuits, including row line drivers (e.g., gate line driver 214A, emission line driver 214B, and column line driver 218) and the pixel circuits in the active area 207 of the display panel 200. For example, power is dissipated due to the parasitic capacitance associated with charging data lines 212 (as represented by $O_{DATA}$ in FIG. 2), with charging scan lines 210 (as represented by $C_{SCAN}$ in FIG. 2), with charging emission lines 211 (as represented by $O_{EM}$ in FIG. 2), with charging lines 213 supplying signals (e.g., clock signals) to the scan line driver (as represented by $C_{SCLK}$ in FIG. 2), and with charging lines 215 supplying signals (e.g., clock signals) to the emission line driver (as represented by $C_{ECLK}$ in FIG. 2). As high display refresh rates (e.g., 120 Hz and 90 Hz) become popular for high quality displays, the power dissipation due to parasitic capacitance becomes a significant drain on the battery that powers in computing device that includes the display panel 200. Power consumed by the display panel 200 is reduced when the display panel is operated at relatively lower refresh rates.

Figure 3:
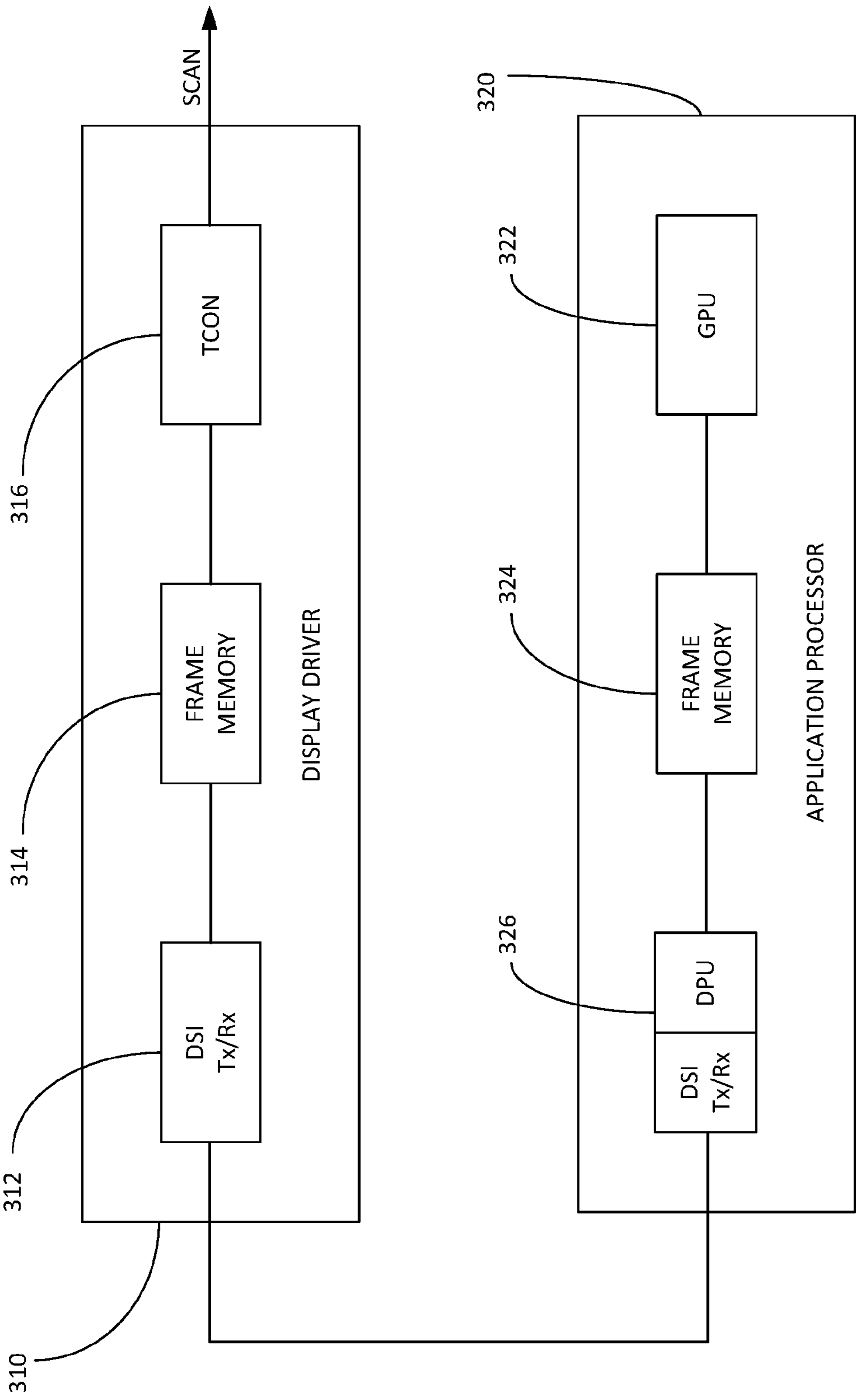
FIG. 3 is a schematic diagram of a system that includes a display driver in communication with an application processor.

FIG. 3 is a schematic diagram of a system 300 that includes a display driver 310 in communication with an application processor 320. The display driver 310 and the application processor 320 can be included in a computing device such as, for example, a mobile phone, a tablet, a laptop, etc. and can cooperate to provide signals to light emitting elements (e.g., OLED pixels) of a display to render images and other graphical information on the display.

The application processor 320 can include a graphics processing unit (GPU) that can generate video output signals that are received and processed by a frame memory unit 324 to generate a signal that is input to a display processing unit (DPU) 326. The DPU 326 can include a transmit-side (Tx) and a receive-side (Rx) that are typically connected by a display serial interface (DSI), although other interfaces such as serial, parallel, or display-port interfaces also can be used. The transmit-side of the DPU 326 in the application processor 320 can transmit signals to the receive-side of the DSI 312 hosted on the display driver 310. Signals transmitted from the application processor 320 to the display driver 310 can include video signals, for example, encoded in mobile industry processor interface (MIPI) standard format. MIPI signals received by the display driver 310 include display data, such as, for example, for controlling the intensity and color of OLED pixels in an active area of the display in a sequence of frames that are rendered on the display. The received display data is buffered in frame memory 314 and processed by a timing controller (TCON) 316 that generates timing signals (SCAN) that are sent to the physical display panel.

The display driver 310 also sends signals to the application processor 320 to coordinate the processing by the two devices. For example, the display driver 310 sends tearing effect (TE) signals that are used for vertical synchronization, i.e., to trigger the redrawing of the display, to the application processor 320, so that the timing of data sent from the GPU 322 to the display driver 310 can be synchronized with the frame data that is output from the display driver 310 to the physical display panel.

Figure 4B:
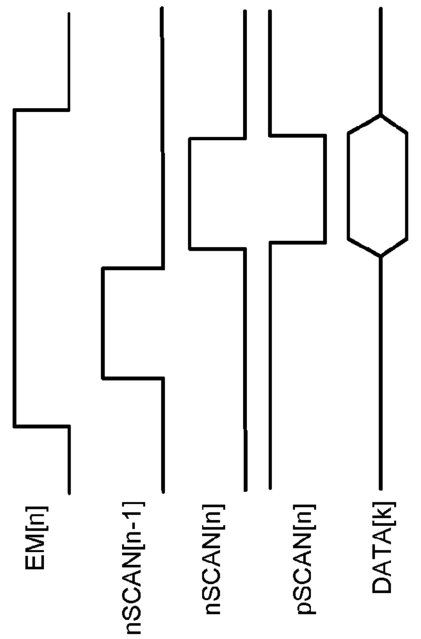
FIG. 4B is a schematic timing diagram of signals for controlling the operation of a light emitting device with the circuit of FIG. 4A.
Figure 4A:
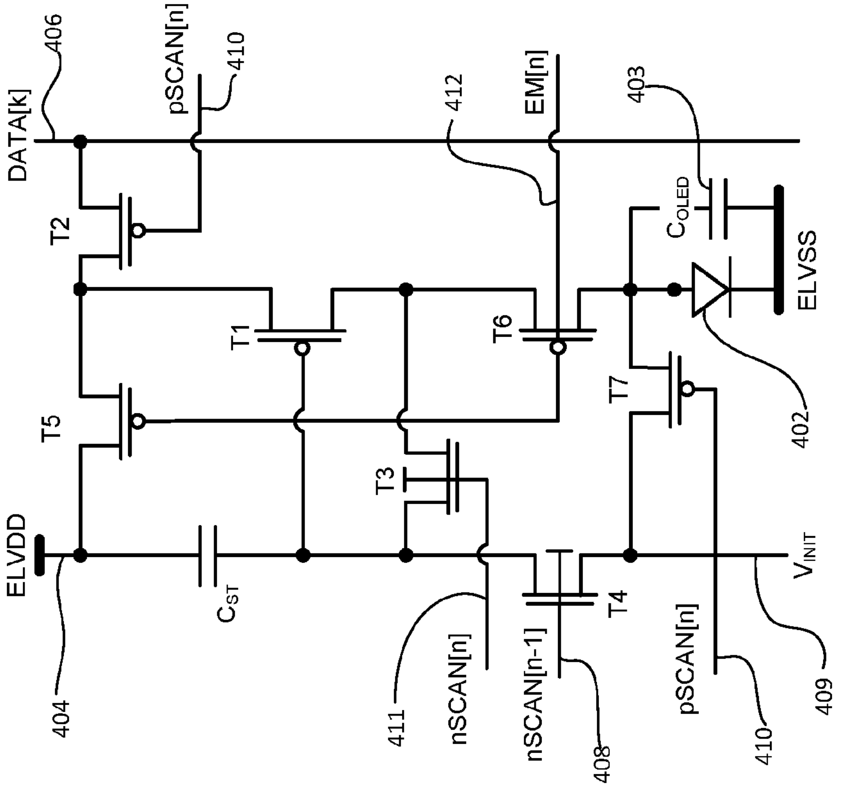
FIG. 4A is a schematic diagram of a circuit for driving a light emitting device of a pixel in an active area of a display panel.

FIG. 4A is a schematic diagram of a circuit 400 for driving a light emitting device (e.g., an organic light emitting diode (OLED)) 402 of a pixel in an active area of a display panel, for supplying a data signal to the device 402 and for refreshing the device 402 to receive a new data signal. The light emitting device 402 can have a capacitance (represented by capacitor 403), such that changing a voltage level across the light emitting device 402 dissipates power. FIG. 4B is a schematic timing diagram for controlling the operation of the light emitting device 402 with the circuit 400.

The circuit 400 can be connected to an initialization voltage supplying line 409 that supplies an initialization voltage $V_{INIT}$, a first power line 404 that supplies a voltage ELVDD, and a data line 406 that supplies a data voltage DATA[k]. Additionally, the circuit 400 can be connected to an $(n-1)^{th}$ scan line 408 that supplies signals nSCAN[n−1], to an p-$n^{th}$ scan line 410 that supplies signals pSCAN[n], to an n-$n^{th}$ scan line 411 that supplies signals nSCAN[n], and to an emission line 412 that supplies signals EM[n].

The circuit 400 can include a driving transistor T1, second to seventh transistors T2 to T7, and a storage capacitor $C_{ST}$, which are configured to drive the light emitting device 402. Each of the transistors T1 to T7 can be implemented using p-channel or n-channel thin film transistor (TFT) technology. In an example implementation, transistors T3 and T4 are implemented as n-channel transistors, while transistors T1, T2, T5, T6, and T7 are implemented as p-channel transistors. For example, transistors T1, T2, T5, T6, and T7 can be low-temperature poly-silicon (LTPS) transistors, and transistors T3 and T4 can be metal oxide transistors.

The light emitting device (e.g., OLED) 402 can include an anode connected to the driving transistor T1 through the driving current control switch transistor, T6, a cathode connected to a low voltage supply voltage ELVSS, and a light emitting layer between the anode and the cathode that generates light, where the amount of generated light is proportional to the amount of current supplied from the driving transistor T1.

A first electrode of the storage capacitor $C_{ST}$ of the circuit 400 can be connected to the line 404 that supplies voltage EVLDD and the storage capacitor $C_{ST}$ can be connected to a gate electrode of the driving transistor T1, such that it is charged with a driving voltage of the driving transistor T1. The driving transistor T1 can control the current that drives the light emitting device (e.g., OLED) 402 by the driving voltage stored in the storage capacitor $C_{ST}$.

Transistor T3 can be controlled by scan signals nSCAN[n] supplied on line 411, and a gate electrode and a drain electrode of the driving transistor T1 can be connected by transistor T3 to make a diode connected driving transistor T1, enabling the data voltage from DATA[k] supplied on line 406 to be stored in the storage capacitor $C_{ST}$ after the transistor T1 is initialized.

Transistor T2 can be controlled by the scan signals pSCAN[n] on line 410 to supply the data voltage DATA[k] from the data line 406 to a source electrode of the driving transistor T1 during a sampling period of the circuit 400.

Transistor T5 can be controlled by light emitting control signals EM[n] on line 412 to supply a high voltage supply voltage ELVDD to a source electrode of the driving transistor T1 during a light emitting period of the circuit 400.

Transistor T6 can be controlled by the light emitting control signals EM[n] on the line 412, such that driving current is supplied from the driving transistor T1 to the light emitting device (e.g., OLED) 402 during a light emitting period of the circuit 400.

Transistor T4 can be controlled by the scan signal nSCAN [n−1] on line 408 to initialize the storage capacitor $C_{ST}$ and a gate electrode of the driving transistor T1 to an initialization voltage $V_{INIT}$ during an initialization period of the circuit 400.

Transistor T7 can be controlled by the scan signals pSCAN[n] on line 410 to initialize an anode of the light emitting device (e.g., OLED) 402. Transistor T7 can be turned on in response to the scan signal pSCAN[n] during a sampling period of the circuit 400 to initialize an anode of the device 402 to the initialization voltage $V_{INIT}$.

Referring to FIG. 4B, when signal EM[n] is high, then transistors T6 and T5 are turned off and driving current is not supplied to device 402. While EM[n] is high, when nSCAN [n−1] is high, the storage capacitor $C_{ST}$ and the gate of the driving transistor T1 are initialized with voltage $V_{INIT}$. Then, when nSCAN[n−1] and pSCAN[n] are low and when nSCAN[n] is high, the voltage DATA[k] is loaded on storage capacitor $C_{ST}$, for use in setting the luminance output of the device 402 when EM[n] subsequently goes low.

In some implementations as shown in FIG. 4A, metal oxide transistors can be used for T3 and T4 to reduce the effect of off-state leakage current in the circuit 400, which can cause the luminance of the light emitting device 402 to change during a display cycle, especially for relatively long frame times (e.g., at low refresh rates). In some implementations, even while metal oxide transistors are used for T3 and T4, LTPS transistors can be used for T1, T2, T5, T6, and T7 to handle other factors that affect optical artifacts (e.g., flicker) at low refresh rates and to maintain a small footprint of the circuit 400.

Thin film transistors used in the circuit 400 exhibit hysteresis characteristics, in that the source-drain current through the transistor for a given gate-source voltage can depend on whether the voltage has increased or decreased from a previous value. For example, for a given gate-source voltage, a source-drain current can be lower when the gate-source voltage has increased from a previous value than when the gate-source voltage has decreased from a previous value. In particular, driving transistor T1 that supplies current to the OLED 402, for a given gate-source voltage, can provide a different current to the OLED depending on whether the gate-source voltage has increased or decreased from a previous value.

Because of the hysteresis characteristics of thin film transistors used in the circuit 400, when the signal encoding a particular intensity for an OLED is transmitted to the circuit 400, the actual intensity output from the OLED may not actually achieve the particular encoded intensity until several frames have been rendered. For example, if no current is supplied to the OLED 402 and the OLED is not outputting any light, then when a data voltage encoding a particular intensity for the OLED is applied to the gate of transistor T1, the actual intensity emitted from the OLED in the first frame for which the data voltage is applied to the gate of T1 may be approximately 80% of the encoded intensity, and the actual intensity in the OLED and second frame for which the data voltage is applied to the approximately 95% of the encoded intensity. Only after three or more frames are rendered, may the intensity of the light emitted from the OLED reach the encoded intensity. Because of this effect, when the intensity of an OLED changes (e.g., when a new image is rendered on display), the desired intensity may not be achieved immediately, but rather may be achieved only after the period of time elapses. For high refresh rates, this period of time may be short enough that evolution of the OLED intensity to its encoded intensity is imperceptible to a human viewer. However, for relatively low refresh rates, the evolution of the OLED intensity to its encoded intensity over the course of a number of frames, may be noticeable to a viewer.

Figure 5C:
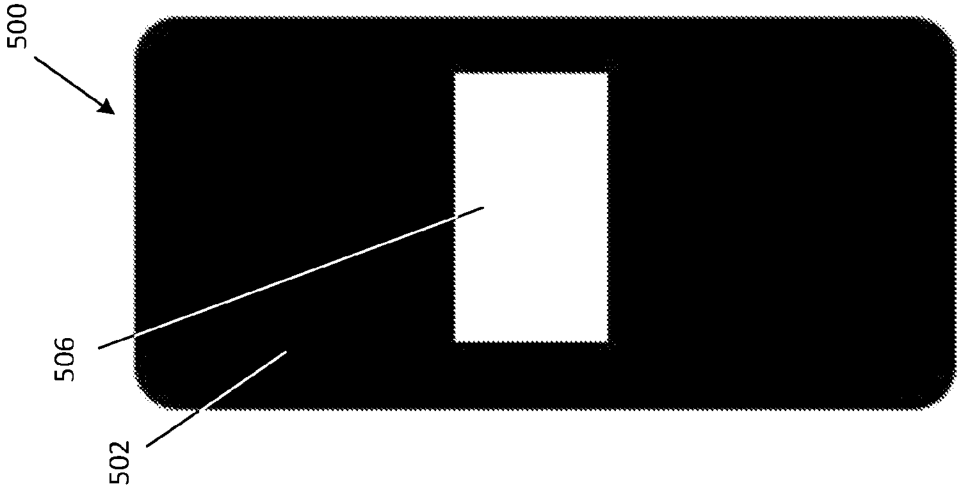
FIGS. 5A, 5B, and 5C are schematic diagrams of a computing device having a display on which is displayed an image.
Figure 5B:
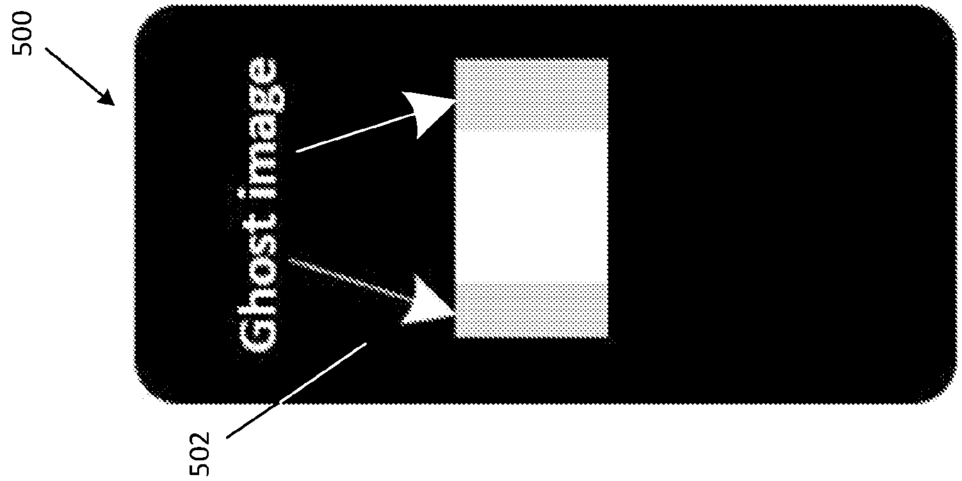
Figure 5A:
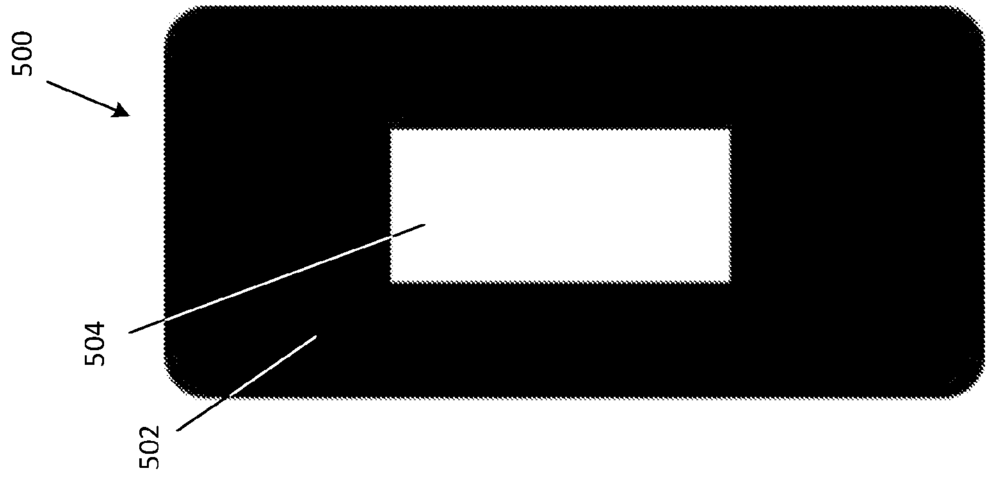

For example, the evolution of pixel intensity from a first value to a final value over the course of a number of frame periods is shown in FIGS. 5A, 5B, and 5C. FIG. 5A is a schematic diagram of a computing device 500 having a display 502 on which is displayed a first image of a white vertical rectangle 504. FIG. 5C is a schematic diagram of the computing device 500 when the display 502 is displaying a second image of a white horizontal rectangle 506. FIG. 5B is a schematic diagram of the computing device 500 shortly after (e.g., one frame time after) signals have been sent to the display 502 instructing the display 502 to cease displaying the white vertical rectangle shown in FIG. 5A and to being displaying the white horizontal rectangle shown in FIG. 5C.

As can be seen from FIG. 5B, the portion of the white horizontal rectangle that overlaps with the vertical rectangle that was previously displayed is rendered by the pixels associated with the overlapping portion as having a luminance value corresponding to the desired final white color of the horizontal rectangle. This is because the gate-source voltage applied to the driving transistors that drive the OLEDs associated with the overlapping portion do not change their values, because they continue to display the same white luminance that they displayed when the vertical rectangle 504 was displayed. However, because of the hysteresis characteristics of the thin film transistors used to drive the OLEDs in the display, in initial frames of the horizontal rectangle, portions of the white horizontal rectangle that do not overlap with the vertical rectangle are rendered with luminance values less than the desired final white color of the horizontal rectangle. This is because the gate-source voltage applied to the driving transistors that drive the OLEDs associated with the nonoverlapping portions must change their values to make the OLEDs turn on when they previously were off. Because of this, during the rendering of a number of initial frames of the white horizontal rectangle, these non-overlapping portions may appear as a "ghost image" of the white horizontal rectangle until a sufficient number of frames have been rendered, such that the light emitted from the OLEDs reach their intended luminance values.

When the display renders frames with a sufficiently high refresh rate, such "ghost images" that appeared during the first few frames of rendering a new image may be imperceptible to a human user. However, for low refresh rates, e.g., below a threshold refresh rate, the appearance of such "ghost images" during the rendering of initial frames of a new image may be perceptible and distracting and/or annoying to a user.

To mitigate the visual impact of frames of images produced with luminance values that do not correspond to their programmed luminance values due to transistor hysteresis in the circuits that control the OLED emitters, the refresh rate can be temporarily increased when a new image is rendered on the display, and then the refresh rate can be returned to a lower, power-saving refresh rate once a sufficient number of frames have been rendered to allow the new image to be rendered with its programmed luminances.

Figure 6:
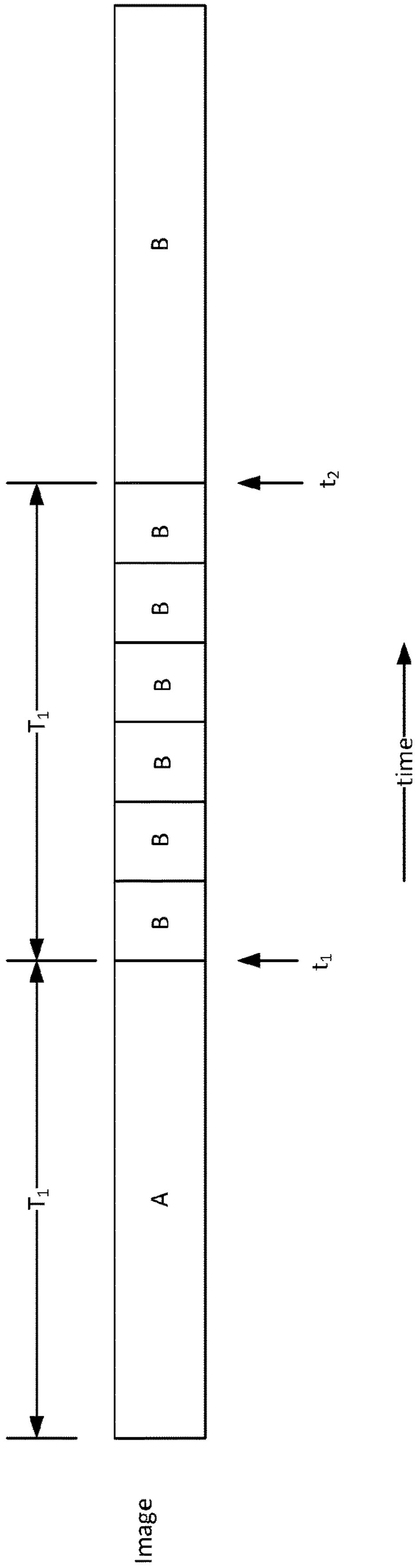
FIG. 6 is a timing diagram of the display of two different images.

FIG. 6 is a timing diagram of the display of two different images: image A and image B, where time is shown on the horizontal, x-axis, with time increasing from left to right. Frames of image A can be rendered on the display at a first refresh rate that is lower than a threshold refresh rate (e.g., 30 Hz, 20 Hz, 10 Hz), with each frame being rendered for a frame period $T_1$. Then, when the new image (i.e., image B) is rendered on the display, beginning at time $t_1$, initial frames of the new image can be rendered at a second refresh rate that is higher than the first refresh rate and that is greater than or equal to the threshold refresh rate. By rendering the initial frames of the new image at the second, higher refresh rate, the effect of transistor hysteresis on the rendering of the new image can be ameliorated over a short enough period of time (e.g., the time to render two or three frames at the second rate) so as to be imperceptible to a human viewer.

In some implementations, the second refresh rate is an integer multiple of the first refresh rate (i.e., when the first refresh rate is M, with M being a real number, and the second refresh rate is N, then M is a factor of N), and the number of initial frames rendered at the second, higher refresh rate is equal to the quotient of the second refresh rate divided by the first refresh rate. For example, if the first refresh rate is 10 Hz, and the second refresh rate is 60 Hz, then six initial frames of image B can be rendered at the 60 Hz refresh rate before rendering reverts to the original 10 Hz refresh rate. When the first refresh rate is 10 Hz and the second refresh rate is 120 Hz, when a new image is rendered on the display, twelve initial frames of the new image can be rendered at the 120 Hz refresh rate before reverting to the 10 Hz refresh rate. When the first refresh rate is 1 Hz and the second refresh rate is 120 Hz, when a new image is rendered on the display, 120 initial frames of the new image can be rendered at the 120 Hz refresh rate before reverting to the 1 Hz refresh rate.

In such implementations, the external processor that sends the image data encoding image B to the display driver need not send image data at the higher rate but can continue to send image data to the display driver at the first, lower refresh rate, along with a signal to change the refresh rate for the initial number of N/M frames. However, after the first frame of image B is rendered at time $t_1$, the external processor need not send any additional MIPI commands to the display driver until the first frame of image B is rendered at the original first refresh rate, beginning at time $t_2$. After the initial number of N/M frames are rendered over the time period $T_1$, the external processor sends a signal to the display driver to change the refresh rate for subsequent renderings of frames of image B. In this manner, the insertion of the high refresh rate frames of image B is very simple and minimizes the power impact on the external processor, because there are no additional frame generation or rendering operations imposed on the external processor. In addition, there is no increase in power consumption due to extra MIPI signals.

In some implementations, when the first refresh rate (M) below the threshold rate is much lower than the second refresh rate (N) that is greater than or equal to the threshold rate, fewer than N/M frames can be rendered at the second, higher refresh rate to address image imperfections caused by transistor hysteresis.

Figure 7:
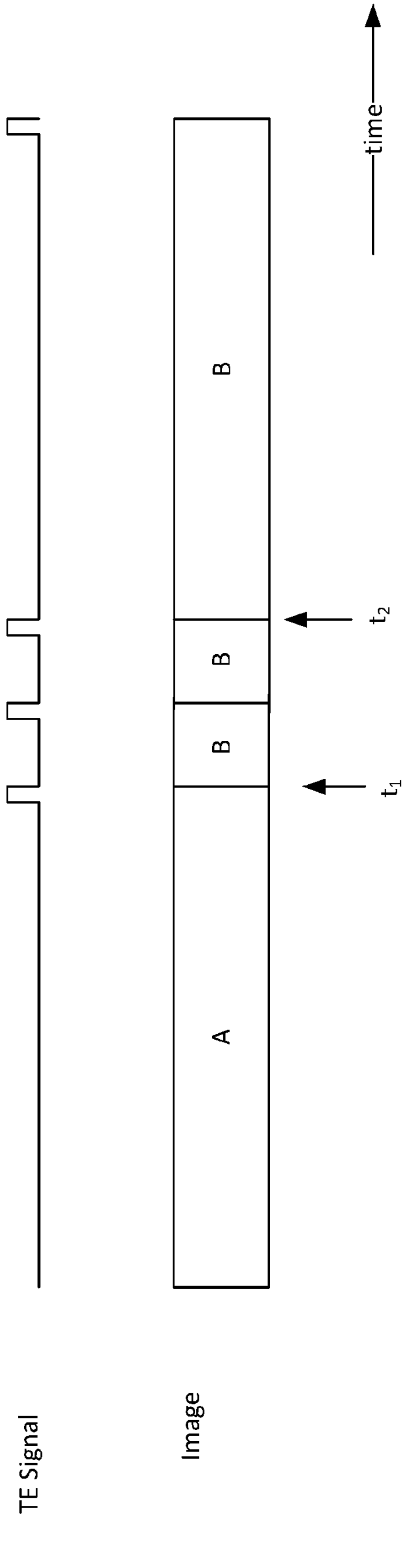
FIG. 7 is a timing diagram of the display of two different images.

FIG. 7 is another timing diagram of the display of two different images: image A and image B, where time is shown on the horizontal, x-axis, with time increasing to the from left to right. Frames of image A can be rendered on the display at a first refresh rate that is lower than a threshold refresh rate (e.g., 30 Hz, 20 Hz, 10 Hz), with each frame being rendered for a frame period $T_1$. Then, when the new image (i.e., image B) is rendered on the display, beginning at time $t_1$, initial frames of the new image can be rendered at a second refresh rate that is higher than the first refresh rate and that is greater than or equal to the threshold refresh rate. The number of initial frames that are rendered at the second, higher refresh rate can be set to a predetermined number (e.g., two or three), and rendering can revert to the first refresh rate at time $t_2$ after the predetermined number of initial frames are rendered.

The number of initial frames that are rendered at the second refresh rate can be counted by counting signals that occur once per frame period. For example, a TE signal or a vertical synchronization signal communicated from the display driver to the external processor can occur once per frame period and can be used to count the number of initial frames. As shown in FIG. 7, a TE signal can be sent once per frame period at the end of the frame period. The external processor (e.g., the application processor or the GPU) can count these signals and once the predetermined number is reached, the external processor can send a signal to the display driver to resume rendering at the first refresh rate. The external processor also can re-synchronize with the display driver by sending new frames of image data to the display driver beginning at time $t_2$.

Rendering a number of initial frames of new image at a refresh rate above a threshold rate to mitigate the effect of transistor hysteresis also can be performed when an existing refresh rate is above the threshold rate, but the new image is to be displayed at a new frame that is lower than the threshold rate.

Figure 8:
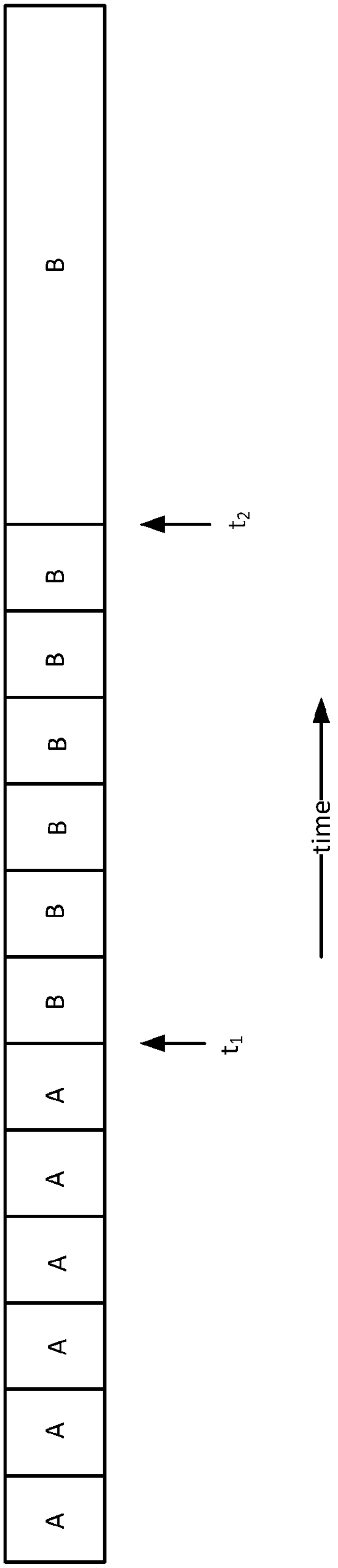
FIG. 8 is a timing diagram of the display of two different images.

FIG. 8 is a timing diagram of the display of two different images: image A and image B, where time is shown on the horizontal, x-axis, with time increasing to the from left to right. Frames of image A can be rendered on the display at a first refresh rate that is great than or equal to a threshold refresh rate (e.g., 30 Hz, 20 Hz, 10 Hz). Then, when the new image (i.e., image B) is rendered on the display, beginning at time $t_1$, an instruction may be sent to the display driver to render the new image at a second refresh rate lower than the threshold rate. However, the rendering at the second refresh rate can be delayed until after a number of initial frames of the new image are rendered at the first refresh rate. By rendering the initial frames of the new image at the first refresh rate, the effect of transistor hysteresis on the rendering of the new image can be ameliorated over a short enough period of time (e.g., two or three frames of the second primary) so as to be imperceptible to a human viewer. Then, the new image can be rendered at the second, lower, refresh rate beginning at time $t_1$.

In some implementations, the number of initial frames of the new image rendered at the first refresh rate can be equal to the quotient of the first refresh rate divided by the second refresh rate. In some implementations, signals that occur once per frame period and that are transmitted from the display driver to an external processor can be counted, and then external processor can instruct the display driver to beginning rendering of the new image at the second refresh rate after a predetermined number of such signals have been counted.

Figure 9:
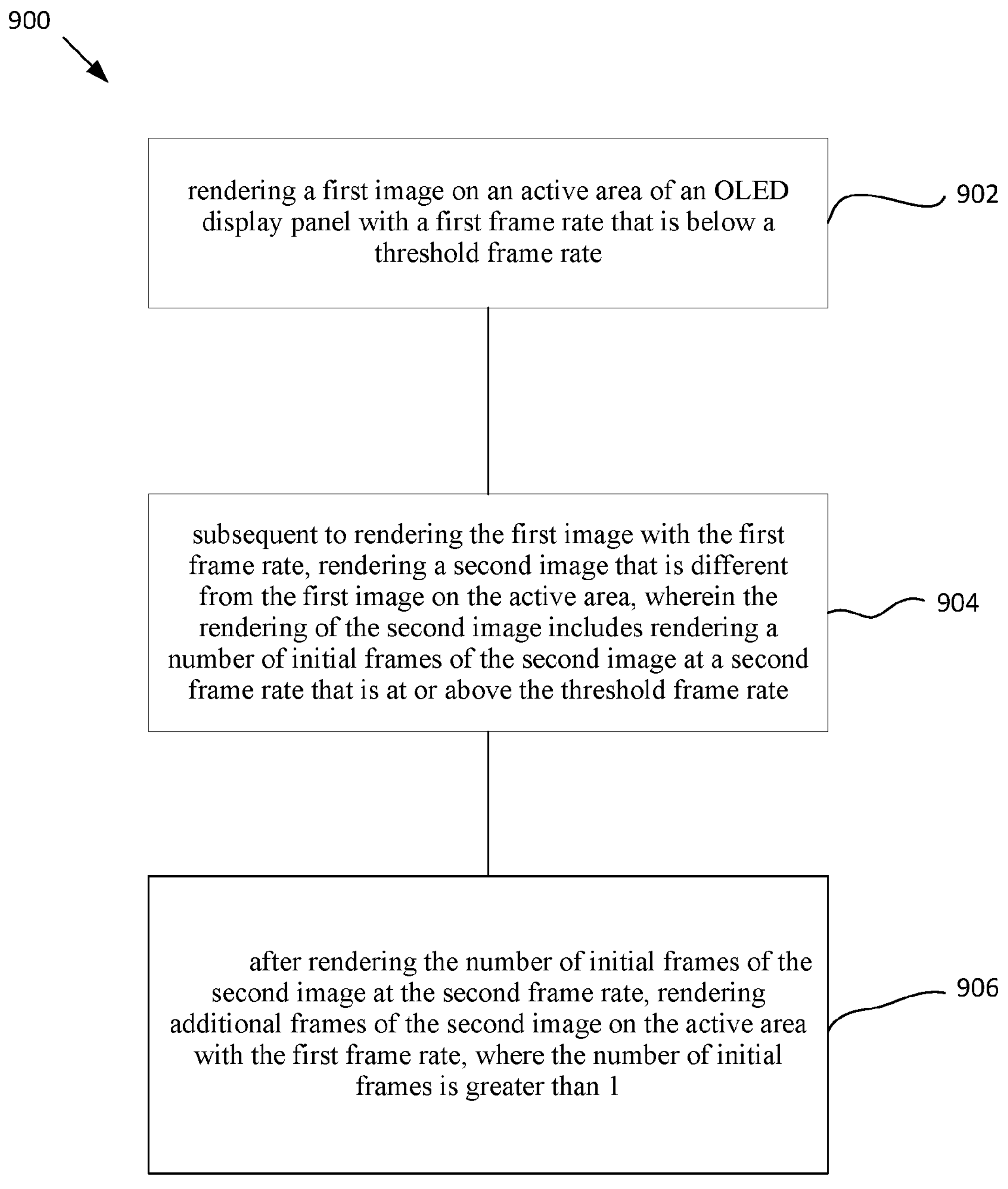
FIG. 9 is a schematic diagram of a process for rendering images on a display panel according to techniques described herein.

FIG. 9 is a schematic diagram of a process for rendering images on a display panel according to techniques described herein. The process includes a method 900 for rendering images on an active area of a display panel, where the display panel includes a plurality of pixels arranged in an array of OLED pixels, and where each pixel of the array includes an OLED light-emitting device, a plurality of pixel circuits, with each pixel circuit being associated with one of the OLED light-emitting devices and being configured to drive its associated OLED light-emitting device.

The method 900 includes rendering a first image on an active area of an OLED display panel with a first refresh rate that is below a threshold refresh rate (902). The method also includes, subsequent to rendering the first image with the first refresh rate, rendering a second image that is different from the first image on the active area, wherein the rendering of the second image includes rendering a number of initial frames of the second image at a second refresh rate that is at or above the threshold refresh rate (904). The method also includes after rendering the number of initial frames of the second image at the second refresh rate, rendering additional frames of the second image on the active area with the first refresh rate, where the number of initial frames is greater than 1 (906).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the true spirit of the embodiments of the invention.

What is claimed is:

1. A display panel comprising:

a plurality of pixels arranged in an array, the array including rows and columns, each pixel of the array including at least one OLED light-emitting device;

a plurality of pixel circuits, each pixel circuit associated with one of the OLED light-emitting devices and configured to drive its associated OLED light-emitting device;

a display driver configured to supply signals to the pixel circuits to cause the display panel to:

render images on an active area of the panel with a plurality of different refresh rates, render a first image on the active area with a first refresh rate that is below a threshold refresh rate, and subsequent to rendering the first image with the first refresh rate, render a second image that is different from the first image on the active area, wherein the rendering of the second image includes rendering a number of initial frames of the second image at a second refresh rate that is at or above the threshold refresh rate, and, after rendering the number of initial frames of the second image at the second refresh rate, rendering additional frames of the second image on the active area with the first refresh rate, wherein the number of initial frames rendered at the second refresh rate is greater than 1 and equal to the quotient of the second refresh rate divided by the first refresh rate.

2. The display panel of claim 1, wherein the threshold rate is 60 Hz or lower.

3. The display panel of claim 1, wherein the threshold rate is 10 Hz or lower.

4. The display panel of claim 1, wherein the first refresh rate is a factor of the second refresh rate.

5. The display panel of claim 1, wherein the display driver is configured to transmit tearing effect (TE) signals once per frame period to an external processor from which the display driver receives frames of image data to render on the active area.

6. A display panel comprising:

a plurality of pixels arranged in an array, the array including rows and columns, each pixel of the array including at least one OLED light-emitting device;

a plurality of pixel circuits, each pixel circuit associated with one of the OLED light-emitting devices and configured to drive its associated OLED light-emitting device;

a display driver configured to supply signals to the pixel circuits to cause the display panel to:

render images on an active area of the panel with a plurality of different refresh rates, render a first image on the active area with a first refresh rate that is below a threshold refresh rate, and subsequent to rendering the first image with the first refresh rate, render a second image that is different from the first image on the active area, wherein the rendering of the second image includes rendering a number of initial frames of the second image at a second refresh rate that is at or above the threshold refresh rate, and, after rendering the number of initial frames of the second image at the second refresh rate, rendering additional frames of the second image on the active area with the first refresh rate, wherein the number of initial frames is greater than 1, wherein the display driver is configured to transmit tearing effect (TE) signals once per frame period to an external processor from which the display driver receives frames of image data to render on the active area, wherein the display driver is configured to receive a command from the external processor in response to the external processor counting a threshold number of TE signals received from the display driver during the rendering of the number of initial frames of the second image at the second refresh rate, and wherein in response to receiving the command, the display driver begins rendering the second image at the first refresh rate.

7. A display panel comprising:

a plurality of pixels arranged in an array, the array including rows and columns, each pixel of the array including at least one OLED light-emitting device;

a plurality of pixel circuits, each pixel circuit associated with one of the OLED light-emitting devices and configured to drive its associated OLED light-emitting device;

a display driver configured to supply signals to the pixel circuits to cause the display panel to:

render images on an active area of the panel with a plurality of different refresh rates, render a first image on the active area with a first refresh rate that is below a threshold refresh rate, and subsequent to rendering the first image with the first refresh rate, render a second image that is different from the first image on the active area, wherein the rendering of the second image includes rendering a number of initial frames of the second image at a second refresh rate that is at or above the threshold refresh rate, and, after rendering the number of initial frames of the second image at the second refresh rate, rendering additional frames of the second image on the active area with the first refresh rate, wherein the number of initial frames is greater than 1, wherein the display driver is configured to transmit tearing effect (TE) signals once per frame period to an external processor from which the display driver receives frames of image data to render on the active area, wherein the display driver is configured to count a number of TE signals transmitted to the external processor during the rendering of the number of initial frames of the second image at the second refresh rate, and wherein the display driver is configured to begin rendering the second image at the first refresh rate in response to the number of counted TE signals equaling a predetermined number.

8. A display panel comprising:

a plurality of pixels arranged in an array, the array including rows and columns, each pixel of the array including at least one OLED light-emitting device;

a plurality of pixel circuits, each pixel circuit associated with one of the OLED light-emitting devices and configured to drive its associated OLED light-emitting device;

a display driver configured to supply signals to the pixel circuits to cause the display panel to:

render images on an active area of the panel with a plurality of different refresh rates, render a first image on the active area with a first refresh rate that is above a threshold refresh rate, and subsequent to rendering the first image with the first refresh rate, render a second image that is different from the first image on the active area, wherein the rendering of the second image includes rendering a number of initial frames of the second image at the first refresh rate, and, after rendering the number of initial frames of the second image at the first refresh rate, rendering additional frames of the second image on the active area with a second refresh rate, wherein the second refresh rate is equal to or below the threshold rate, and wherein the number of initial frames rendered at the first refresh rate is greater than 1 and equal to the quotient of the first refresh rate divided by the second refresh rate.

9. The display panel of claim 8, wherein the threshold rate is 30 Hz or lower.

10. The display panel of claim 8, wherein the threshold rate is 10 Hz or lower.

11. The display panel of claim 8, wherein the first refresh rate is a factor of the second refresh rate.

12. The display panel of claim 8, wherein the display driver is configured to transmit tearing effect (TE) signals once per frame period to an external processor from which the display driver receives frames of image data to render on the active area.

13. The display panel of claim 12, wherein the display driver is configured to receive a command from the external processor in response to the external processor counting a threshold number of TE signals received from the display driver during the rendering of the number of initial frames of the second image at the first a refresh rate, and wherein in response to receiving the command, the display driver begins rendering the second image at the second refresh rate.

14. The display panel of claim 12, wherein the display driver is configured to count a number of TE signals transmitted to the external processor during the rendering of the number of initial frames of the second image at the first refresh rate, and wherein the display driver is configured to begin rendering the second image at the second refresh rate in response to the number of counted TE signals equaling a predetermined number.

15. A method comprising:

rendering a first image on an active area of an OLED display panel with a first refresh rate that is below a threshold refresh rate;

subsequent to rendering the first image with the first refresh rate, rendering a second image that is different from the first image on the active area, wherein the rendering of the second image includes rendering a number of initial frames of the second image at a second refresh rate that is at or above the threshold refresh rate; and after rendering the number of initial frames of the second image at the second refresh rate, rendering additional frames of the second image on the active area with the first refresh rate, wherein the number of initial frames rendered at the second refresh rate is greater than 1 and equal to the quotient of the second refresh rate divided by the first refresh rate.

16. The method of claim 15, wherein the threshold rate is 60 Hz or lower.

17. The method of any of claim 15, wherein the first refresh rate is a factor of the second refresh rate.

* * * * *